Patented Nov. 8, 1949

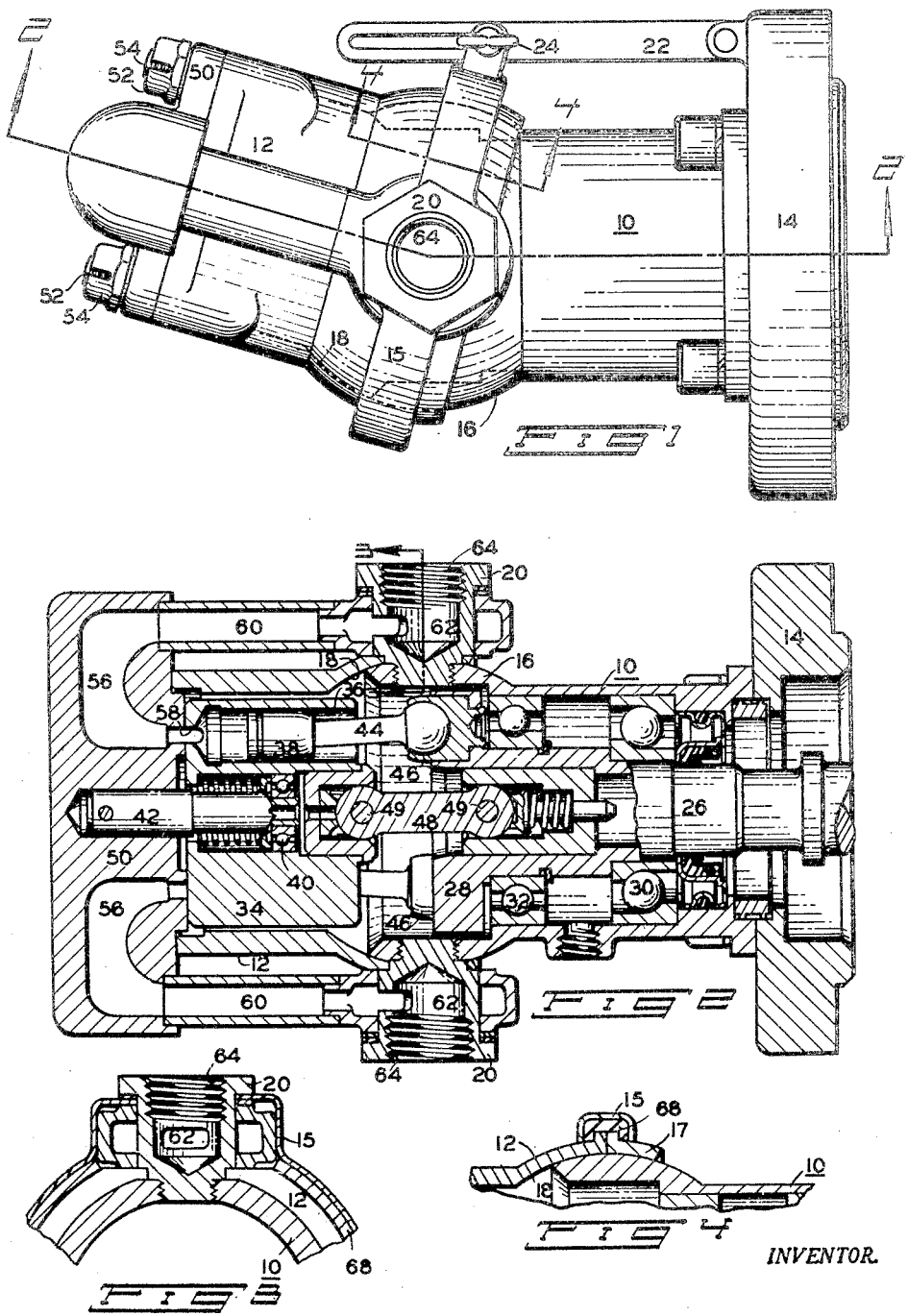
INVENTOR.
Ralph L. Tweedale

2,487,617

UNITED STATES PATENT OFFICE 2,487,617

POWER TRANSMISSION

Ralph L. Tweedale, Birmingham, Mich., assignor to Vickers Incorporated, Detroit, Mich., a corporation of Michigan Application March 29, 1946, Serial No. 658,150

13 Claims. (Cl. 103—162)

This invention relates to power transmissions, particularly to those of the type comprising two or more fluid pressure energy translating devices, one of which may function as a pump and another as a fluid motor.

The present invention is particularly concerned with fluid pressure energy translating devices of the variable displacement type and especially with those employing a driven member comprising a revolving cylinder barrel with axially displaced cylinders and pistons reciprocable therein. In such a device the driven member is usually carried by a swinging yoke, whereby the cylinder barrel may be angularly displaced from the driving member and thereby change the piston travel or displacement.

In standard pumps of the variety related above, a large casing for housing the rotating group and allowing sufficient clearance for the swinging yoke, is required. The yoke is also designed to carry inlet and outlet passages in its arms which extend from the valve plate at the head of the cylinder barrel to the hollow trunnions or pintles. The hollow pintles perform the dual function of pivoting the yoke and acting as inlet and outlet connections for the pump.

Pumps for various uses and particularly those employed in aircraft work, frequently have weight limitations imposed upon the design. Space is held at a premium and a reduction in pump size is desirable providing it does not affect the pump capacity.

Therefore, an object of the present invention is to provide an improved variable pump construction of lighter weight and more rugged, compact, and reliable construction.

It is also an object to provide a variable pump casing in two sections pivoted at their adjoining ends whereby the casing itself performs the structural purpose of the standard yoke design.

A further object is to provide a variable pump design in which the fluid passages normally carried in the hollow arms of the yoke will be positioned externally of the casing.

Further objects and advantages of the present invention will be apparent from the following description, reference being had to the accompanying drawing wherein a preferred form of the present invention is clearly shown.

In the drawing:

Figure 1 is a side elevational view of a variable displacement pump incorporating a preferred form of the present invention.

Figure 2 is a cross-sectional view on line 2—2 of Figure 1.

Figure 3 is a sectional view of the pintle and casing connection on line 3—3 of Figure 2.

Figure 4 is a sectional view of the casing section joint and sealing rings on line 4—4 of Figure 1.

The pump is provided with a casing in two sections, a stationary section 10 and a swinging section 12 mounted on a base 14. One end of the stationary section 10 is formed into a ball joint 16, while the cooperating end of section 12 and its extension 15 joined by the seal 17 are formed into a socket 18. The two casing sections are pivoted on pintles or trunnions 20, and the swinging section 12 is adjustably fastened in any selected position by arm 22 and wing nut 24.

Figures 3 and 4 show in detail the structural features of the ball and socket joint connecting the two casing sections. To assemble the swinging section 12 and extension 17 onto the ball joint portion 16, the sealing ring 15 is bent to form the U-shaped structure shown in Figure 4 and maintain the seal 68 in position.

The driving member, comprising a shaft 26 and flange portion 28, is rotatably supported on ball bearings 30 and 32 in the stationary casing section 10. The driven member, comprising a cylinder barrel 34, a plurality of cylinders 36, and axially reciprocal pistons 38 therein, is supported on bearing 40 and pin 42. The pistons 38 are connected to the flange 28 of the driving member by piston rods 44 which are held in ball sockets 46. A Cardan shaft 48 and universal joints 49 link the driving and driven members. A valve plate 50 is fastened to the casing 12 by means of nuts 52 and studs 54.

A passage 56 in the valve plate 50 communicates with the cylinders 36 by means of passage 58. The valve plate passage 56 is connected by means of conduit 60 with the internal bores 62 of pintles 20 which form inlet and outlet connections 64 for the pump.

In operation, hydraulic fluid is supplied through inlet connection 64, bore 62, and conduit 60 to the valve plate 50. Thence the fluid is ported through valve passage 56 to cylinder passages 58 and cylinders 36, on the piston suction stroke. On the compression stroke, the pressure fluid is discharged through similar passages, the passages serving the dual purpose of both inlet and outlet according to the direction of flow.

When the driving member 26 and the cylinder barrel 34 are in axial alignment, there will be no reciprocable axial travel of the pistons 38. As the axes of the driving and driven members are angularly displaced as is the case in Figure 1, the pistons 38 reciprocate in cylinders 36. As the angle of displacement increases, the pump capacity increases also. In order to vary the pump capacity, the wing nut 24 is loosened, and the swinging section 12 of the casing is rotated to the desired angle.

It will thus been seen that the present invention has provided a variable pump suitable for use in confined quarters and being considerably lighter than standard yoke-type designs. This is accomplished by employing a two-section casing wherein one section is hinged to the other and inlet and outlet passages connecting to the valve plate are provided external of the casing.

While the form of embodiment of the invention as herein disclosed constitutes a preferred form, it is to be understood that other forms might be adopted, all coming within the scope of the claims which follow.

What is claimed is as follows:

1. In a fluid pressure energy translating device the combination of a casing enclosing a driving member, a driven member comprising a revolving cylinder barrel with a plurality of cylinders therein and pistons reciprocable in the cylinders, the casing being constructed in two sections and provided with a pivotal joint between the two sections to permit angular displacement between the casing sections, and between the driving and driven members for varying the displacement.

2. In a fluid pressure energy translating device the combination of a casing enclosing a driving member, a driven member comprising a revolving cylinder barrel with a plurality of cylinders therein and pistons reciprocable in the cylinders, a plate valve adjacent the end of the cylinder barrel for porting the cylinders, the casing being constructed in two sections pivoted on a pair of hollow pintles forming inlet and outlet connections for the device to permit angular displacement between the casing sections, and between the driving and driven members for varying the displacement, and inlet and outlet conduits external of the casing connecting the plate valve to the hollow pintles.

3. In a fluid pressure energy translating device the combination of a casing enclosing a driving member, a driven member comprising a revolving cylinder barrel with a plurality of cylinders therein and pistons reciprocable in the cylinders, the casing being constructed in two sections, the adjoining ends of the two casing sections being constructed respectively in the form of a hollow ball and socket joint with suitable packing to form an oil tight swivel joint to permit angular displacement between the casing sections, and between the driving and driven members for varying the displacement.

4. In a fluid pressure energy translating device the combination of a two section casing member, one section being stationary and housing a driving member, the other section being pivoted on hollow pintles fixed to the stationary section and housing a driven member comprising a revolving cylinder barrel with a plurality of cylinders therein and pistons reciprocable in the cylinders, a valve plate in bearing contact with the cylinder barrel for porting the cylinders, the hollow pintles being adapted to form inlet and outlet connections for the device, and inlet and outlet passages connecting the valve plate to the hollow pintles external to the casing member.

5. In a fluid pressure energy translating device the combination of a two section casing member, one section being stationary and housing a driving member, the other section being pivoted on hollow pintles fixed to the stationary section and housing a driven member comprising a revolving cylinder barrel with a plurality of cylinders therein and pistons reciprocable in the cylinders, the adjoining ends of the two casing sections being constructed respectively in the form of a hollow ball and socket joint, a valve plate in bearing contact with the cylinder barrel for porting the cylinders, the hollow pintles being adapted to form inlet and outlet connections for the device and inlet and outlet passages connecting the valve plate to the hollow pintles external to the casing member.

6. In a fluid pressure energy translating device the combination of a driven member comprising a revolving cylinder barrel with axially disposed cylinders and pistons reciprocable therein, a driving member including a rotative shaft and flange linked to the pistons by piston rods whereby the cylinder displacement and piston stroke is varied by angular displacement of the rotative axis of the driving and driven members, and a two piece casing comprising a stationary section for housing the driving member, and a swinging section pivoted to the stationary section for housing the driven member and adapted to angularly displace the axis of the driven member with reference to the axis of the driving member and thereby vary the length of the piston stroke and displacement.

7. In a fluid pressure energy translating device the combination of a driven member comprising a revolving cylinder barrel with axially disposed cylinders and pistons reciprocable therein, a driving member including a rotative shaft and flange linked to the pistons by piston rods whereby the cylinder displacement and piston stroke is varied by angular displacement of the rotative axis of the driving and driven members, and a two piece casing comprising a stationary section for housing the driving member, and a swinging section pivoted to the stationary section and housing the driven member in a confined chamber of a size permitting only rotative movement of the driven member about its own axis within the casing, the casing section and driven member being adapted to swing in unison about the pivots to thereby vary the length of the piston stroke and displacement.

8. In a fluid pressure energy translating device the combination of a driven member comprising a revolving cylinder barrel with axially disposed cylinders and pistons reciprocable therein, a driving member including a rotative shaft and flange linked to the pistons by piston rods whereby the cylinder displacement and piston stroke is varied by angular displacement of the rotative axis of the driving and driven members, a two piece casing comprising a stationary section for housing the driving member, and a swinging section pivoted to the stationary section for housing the driven member and adapted to angularly displace the axis of the driven member with reference to the axis of the driving member and thereby vary the length of the piston stroke and displacement, a valve plate in bearing contact with the cylinder barrel for porting the cylinders, and flexible means for conducting inlet and outlet pressure fluid to and away from the valve plate without interfering with the swinging movement of the case section housing the driven member.

9. In a fluid pressure energy translating device the combination of a driven member comprising a revolving cylinder barrel with axially disposed cylinders and pistons reciprocable therein, a driving member including a rotative shaft and flange linked to the pistons by piston rods whereby the cylinder displacement and piston stroke is varied by angular displacement of the rotative axis of the driving and driven members, a two piece casing comprising a stationary section for housing the driving member, and provided with hollow trunnions, and a swinging section pivoted to the stationary section trunnions for housing the driven member and adapted to angularly displace the axis of the driven member with reference to the axis of the driving member and thereby vary the length of the piston stroke and displacement, a valve plate in bearing contact with the cylinder barrel for porting the cylinders, the hollow trunnions being adapted to form inlet and outlet connections for the device, and inlet and outlet passages extending from the valve plate to the trunnions external of the casing.

10. In a fluid pressure energy translating device the combination of a driven member comprising a revolving cylinder barrel with axially disposed cylinders and pistons reciprocable therein, a driving member including a rotative shaft and flange linked to the pistons by piston rods whereby the cylinder displacement and piston stroke is varied by angular displacement of the rotative axis of the driving and driven members, and a two piece casing comprising a stationary section for housing the driving member, and a swinging section pivoted to the stationary section by means of a ball and socket type joint formed at the adjoining ends of the casing sections for housing the driven member and adapted to angularly displace the axis of the driven member with reference to the axis of the driving member and thereby vary the length of the piston stroke and displacement.

11. In a fluid pressure energy translating device the combination of a rotary drive shaft journalled in a stationary shaft supporting member, a cylinder barrel rotatable with the shaft on an axis at an angle to the shaft axis with reciprocable pistons carried by the cylinder barrel and in thrust-transmitting relation to the shaft, and a housing member enclosing the cylinder barrel and providing an oscillatable thrust-receiving support therefor, said housing member having a spherical portion engaging and partially surrounding the shaft supporting member whereby the angle of the cylinder barrel axis to the shaft axis may be varied.

12. In a fluid pressure energy translating device the combination of a rotary drive shaft journalled in a stationary shaft supporting member, a cylinder barrel rotatable with the shaft on an axis at an angle to the shaft axis with reciprocable pistons carried by the cylinder barrel and in thrust-transmitting relation to the shaft, and a housing member enclosing the cylinder barrel and providing an oscillatable thrust-receiving support therefor, said housing member having a spherical portion engaging and partially surrounding the shaft supporting member to transmit the cylinder barrel thrust to the shaft supporting member whereby the angle of the cylinder barrel axis to the shaft axis may be varied.

13. In a fluid pressure energy translating device the combination of a rotary drive shaft journalled in a stationary shaft supporting member, a cylinder barrel rotatable with the shaft on an axis at an angle to the shaft axis with reciprocable pistons carried by the cylinder barrel and in thrust-transmitting relation to the shaft, a housing member enclosing the cylinder barrel and providing an oscillatable thrust-receiving support therefor, said housing member having a spherical portion engaging and partially surrounding the shaft supporting member, means carried by the housing forming a pressure fluid passage connecting with the cylinder barrel, and a hollow pintle member at one side of the spherical portion through which pressure fluid may be delivered to or from said passage and which forms a stationary fluid connection for the device.

RALPH L. TWEEDALE.

REFERENCES CITED

The following references are of record in the file of this patent:

UNITED STATES PATENTS

| Number | Name | Date |
| --- | --- | --- |
| 2,155,455 | Thoma | Apr. 25, 1939 |
| 2,277,570 | Vickers | May 24, 1942 |
| 2,284,146 | Herman | May 26, 1942 |
| 2,298,850 | Vickers | Oct. 13, 1942 |